W. SCHUMAKER.
COLTER.
APPLICATION FILED DEC. 4, 1916.
1,221,915.
Patented Apr. 10, 1917.
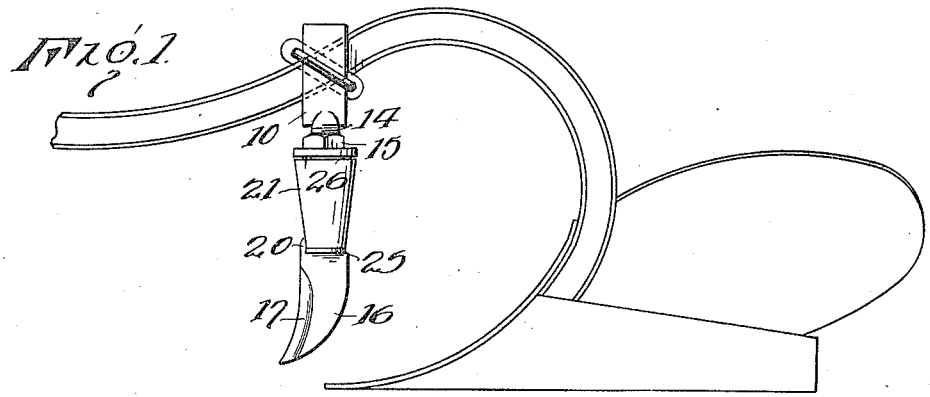
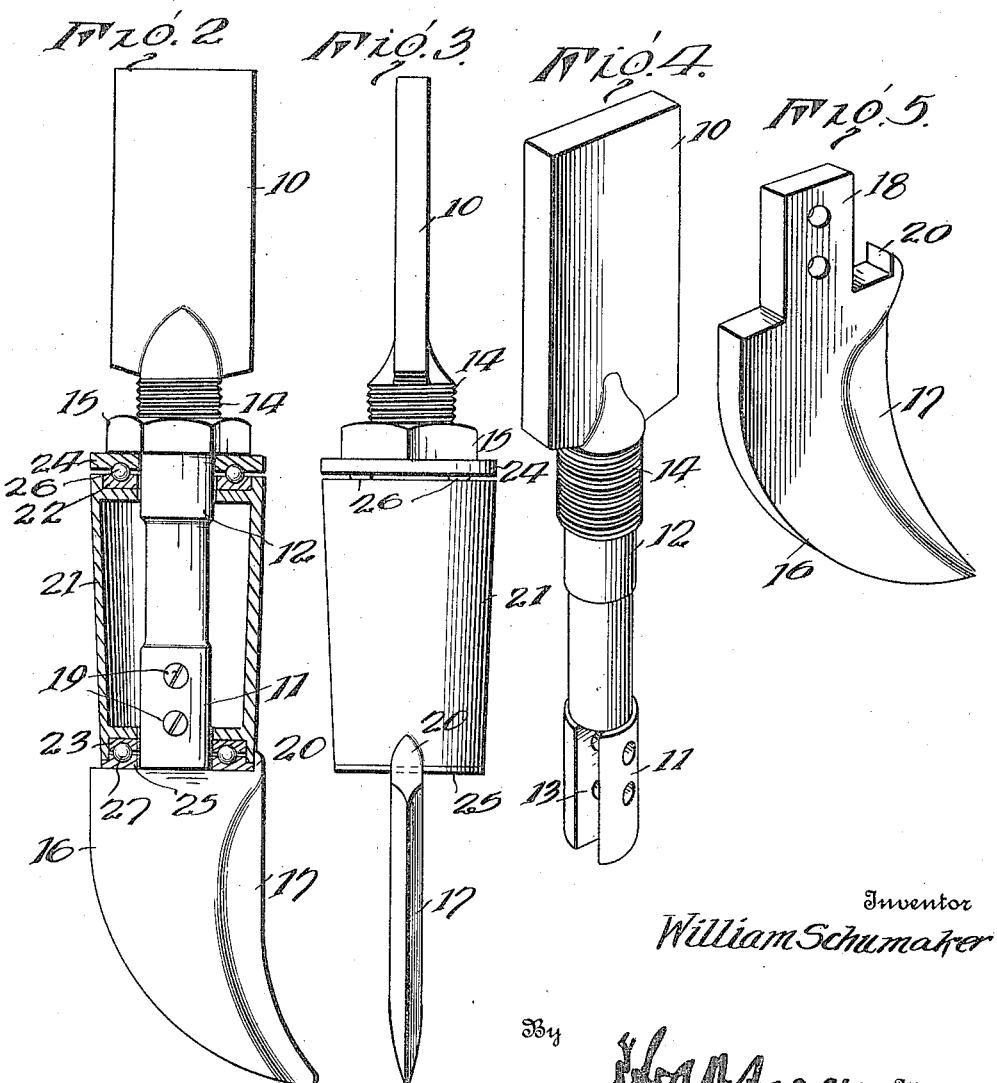
Inventor
William Schumaker
By _____, Attorneys

UNITED STATES PATENT OFFICE.

WILLIAM SCHUMAKER, OF DETROIT, MICHIGAN.

COLTER.

1,221,915.  Specification of Letters Patent.  Patented Apr. 10, 1917.

Application filed December 4, 1916.  Serial No. 134,985.

*To all whom it may concern:*

Be it known that I, WILLIAM SCHUMAKER, a citizen of the United States, residing at Detroit, in the county of Wayne and State of Michigan, have invented certain new and useful Improvements in Colters, of which the following is a specification.

This invention relates to colter devices employed upon plows and similar implements, and has for one of its objects to provide a simply constructed device which may be applied without material structural change to various forms of plows and like implements, and which effectually prevents the clogging of the plow by weeds, clods, trash and the like.

With these and other objects in view, the invention consists in certain novel features of construction, as hereinafter shown and described and then specifically pointed out in the claims: and in the drawings illustrative of the preferred embodiment of the invention—

Figure 1 is a side elevation of the improved implement applied to the beam of a plow.

Fig. 2 is an enlarged side elevation, partly in section, of the improved attachment.

Fig. 3 is a front elevation of the same.

Fig. 4 is a detached perspective view of the stock or body portion of the attachment.

Fig. 5 is a detached perspective view of the blade portion of the attachment.

Corresponding and like parts are referred to in the following description and indicated in all the views of the drawings by the same reference characters.

The improved device comprises a stock including a longitudinally widened portion 10 at one end, a bearing 11 at the other end and an intermediate bearing 12, the bearing 11 having a longitudinal downwardly opening socket 13. The stock 10 is enlarged between the bearing 12 and the laterally enlarged portion 10 and threaded as shown at 14 to receive a clamp nut 15.

The colter blade portion of the device is represented as a whole at 16 with one edge in knife like form as shown at 17 and with a stud 18 extending above its upper end to engage in the socket 13 of the bearing 11.

The bearing 11 and the stud 18 are perforated to receive clamp screws 19 whereby the colter member is coupled to the stock. A guard lip 20 rises from the knife edged side of the colter, as shown.

A roller device represented as a whole at 21 is mounted for rotation upon the bearings 11—12. At its upper end the member 21 is formed with a depression to receive an annular wear member 22, while the member 21 is provided with a similar depression in its lower end to receive an annular wear member 23. Surrounding the bearing 12 above the roller member 21 is another annular wear member 24, while a similar annular wear member 25 surrounds the bearing 11 between the wear member 23 and the upper end of the colter member 16. The adjacent faces of the wear members 22—24 are channeled to receive anti friction balls 26, while the adjacent faces of the wear members 23—25 are similarly channeled to receive bearing balls 27.

The clamp nut 15 engages the upper face of the wear member 24. By this arrangement it will be obvious that the roller member 21 is provided with effectual ball bearing joints, and the tension of the joints is controlled by actuating the clamp nut 15. The guard lip 20 covers the joint between the members 21 and 16 and thus prevents the entrance of matter between the parts.

By this simple means when the improved device is applied to a plow the colter blade operates to open a furrow in advance of the mold board, while the roller member 21 operates to turn weeds, trash or clods to one side and away from the mold board and effectually prevent the latter from being clogged thereby. The colter blade portion of the device is the only part which is subject to wear from friction, and when worn can be readily replaced at small expense without discarding the remaining portions of the device.

Having thus described the invention, what is claimed as new is—

1. In a device of the class described, a stock adapted to be coupled to a support and having a socket at one end and intermediate bearings spaced apart, a colter device supported in said socket, and a roller member mounted for rotation on said bearings.

2. In a device of the class described, a stock adapted to be coupled to a support and having bearings spaced apart with a socket in one of said bearings, a colter device including lateral supporting shoulders and a reduced portion to be received in said socket, and a roller member mounted for rotation on said bearings and supported by said shoulders.

3. In a device of the class described, a stock adapted to be coupled to a support and having bearings spaced apart with a socket in one of said bearings, a colter device including a reduced portion to enter said socket and lateral supporting shoulders, one of said shoulders having a guard lip, and a roller member mounted for rotation on said bearings and rearwardly of said guard lip and supported by said shoulders.

4. In a device of the class described, a stock having a socket and intermediate bearings and a laterally enlarged portion adapted to be coupled to a support, said stock being threaded between the lateral enlargement and the bearings, a colter device supported in said socket, a roller member mounted for rotation upon said bearings, and a clamp nut engaging the threaded portion of the stock and operating to hold said roller in position.

5. In a device of the class described, a stock having intermediate bearings and adapted to be coupled to a support, a colter device connected to said stock and including bearing shoulders, a roller device mounted for rotation upon said bearings, a wear member between said colter shoulders and the roller device, a wear member between said roller and the support engaging portion of the stock, and means engaging said last mentioned wear member for holding the roller in position relative to the stock.

6. In a device of the class described, a stock having intermediate bearings and a threaded portion and adapted to be coupled to a support, a colter device connected to said stock and including bearing shoulders, a roller mounted for rotation upon said bearings, a wear member between said colter shoulders and the roller, a wear member between said roller and the threaded portion of the stock and a nut engaging threaded portion of the stock and bearing upon said last mentioned wear member for holding the roller in position relative to the stock.

7. In a device of the class described, a stock having intermediate bearings and adapted to be coupled to a support, a colter device connected to said stock and including bearing shoulders, a roller rotative relative to said stock and having depressions in the ends, wear members in said depression, a lower wear member between one of said roller supported wear members and the shoulders of the colter, another wear member above the other roller supported wear member, anti-friction balls coacting with said wear members, and means carried by said stock for holding said roller in position.

In testimony whereof I affix my signature.

WILLIAM SCHUMAKER. [L. S.]

Copies of this patent may be obtained for five cents each, by addressing the "Commissioner of Patents, Washington, D. C."